(12) United States Patent
Trainin et al.

(10) Patent No.: US 6,715,029 B1
(45) Date of Patent: Mar. 30, 2004

(54) METHOD AND APPARATUS FOR POSSIBLY DECREASING THE NUMBER OF ASSOCIATIVE MEMORY ENTRIES BY SUPPLEMENTING AN ASSOCIATIVE MEMORY RESULT WITH DISCRIMINATOR BITS FROM AN ORIGINAL SET OF INFORMATION

(75) Inventors: Oded Trainin, Tel-Aviv (IL); Dov A. Freund, Petach-Tikva (IL); Gil Goren, Ra'anana (IL)

(73) Assignee: Cisco Technology, Inc., San Jose, CA (US)

(*) Notice: Subject to any disclaimer, the term of this patent is extended or adjusted under 35 U.S.C. 154(b) by 112 days.

(21) Appl. No.: 10/041,825

(22) Filed: Jan. 7, 2002

(51) Int. Cl.[7] .............................................. G06F 12/00
(52) U.S. Cl. .................................... 711/108; 365/49
(58) Field of Search ................................ 711/108, 202, 711/214, 215, 217, 220, 221; 365/49

(56) References Cited

U.S. PATENT DOCUMENTS

| | | | |
|---|---|---|---|
| 3,648,254 A | | 3/1972 | Beausoleil |
| 4,296,475 A | | 10/1981 | Nederlof et al. |
| 4,791,606 A | | 12/1988 | Threewitt et al. |
| 4,996,666 A | | 2/1991 | Duluk, Jr. |
| 5,088,032 A | | 2/1992 | Bosack |
| 5,319,763 A | | 6/1994 | Ho et al. |
| 5,383,146 A | | 1/1995 | Threewitt |
| 5,440,715 A | | 8/1995 | Wyland |
| 5,450,351 A | | 9/1995 | Heddes |
| 5,481,540 A | | 1/1996 | Huang |
| 5,515,370 A | | 5/1996 | Rau |
| 5,564,052 A | * | 10/1996 | Nguyen et al. ............... 712/42 |
| 5,740,171 A | | 4/1998 | Mazzola et al. |
| 5,835,963 A | * | 11/1998 | Yoshioka et al. ........... 711/207 |
| 5,841,874 A | | 11/1998 | Kempke et al. |

(List continued on next page.)

OTHER PUBLICATIONS

Jon P. Wade and Charles G. Sodini, "A Ternary Content Addressable Search Engine," IEEE Journal of Solid–State Circuits, vol. 24, No. 4, Aug. 1989, pp. 1003–1013.

Teuvo Kohonen, Content–Addressable Memories, 1987, pp. 128–129 and 142–144, Springer–Verlang, New York.

Brian Dipert, ed., "Special–purpose SRAMs Smooth the Ride, " EDN, Jun. 24, 1999, pp. 93–104.

"Extending the LANCAM Comparand," Application Brief AB–N3, Rev. 1.0a Draft, Music Semiconductors, Milpitas, CA, Sep. 30, 1998, 4 pages.

(List continued on next page.)

Primary Examiner—Donald Sparks
Assistant Examiner—Christian P. Chace
(74) Attorney, Agent, or Firm—The Law Office of Kirk D. Williams (57) ABSTRACT

Methods and apparatus are disclosed for possibly decreasing the number of associative memory entries by supplementing an associative memory result with discriminator bits from an original set of information. One implementation operates on a set of information, the set of information including a lookup word portion and a discriminator portion. A lookup word is derived based on the lookup word portion. A lookup operation is performed on an associative memory, such as, but not limited to a binary or ternary content-addressable memory, using the lookup word to generate an associative memory result. A memory lookup operation is performed on a memory based on the associative memory result and the discriminator portion.

24 Claims, 7 Drawing Sheets

U.S. PATENT DOCUMENTS

| | | | |
|---|---|---|---|
| 5,842,040 A | | 11/1998 | Hughes et al. |
| 5,898,689 A | | 4/1999 | Kumar et al. |
| 5,920,886 A | * | 7/1999 | Feldmeier .................. 711/108 |
| 5,920,900 A | * | 7/1999 | Poole et al. ................ 711/216 |
| 5,930,359 A | | 7/1999 | Kempke et al. |
| 5,956,336 A | | 9/1999 | Loschke et al. |
| 5,978,885 A | | 11/1999 | Clark, II |
| 6,000,008 A | | 12/1999 | Simcoe |
| 6,026,467 A | * | 2/2000 | Petty .......................... 711/108 |
| 6,034,965 A | * | 3/2000 | Pollack et al. .............. 370/442 |
| 6,041,389 A | | 3/2000 | Rao |
| 6,047,369 A | | 4/2000 | Colwell et al. |
| 6,061,368 A | | 5/2000 | Hitzelberger |
| 6,069,573 A | | 5/2000 | Clark, II et al. |
| 6,081,440 A | | 6/2000 | Washburn et al. |
| 6,091,725 A | | 7/2000 | Cheriton et al. |
| 6,097,724 A | | 8/2000 | Kartalopoulos |
| 6,134,135 A | | 10/2000 | Andersson |
| 6,137,707 A | | 10/2000 | Srinivasan et al. |
| 6,141,738 A | | 10/2000 | Munter et al. |
| 6,148,364 A | | 11/2000 | Srinivasan et al. |
| 6,154,384 A | | 11/2000 | Nataraj et al. |
| 6,175,513 B1 | | 1/2001 | Khanna |
| 6,181,698 B1 | | 1/2001 | Hariguchi |
| 6,199,140 B1 | | 3/2001 | Srinivasan et al. |
| 6,233,652 B1 | * | 5/2001 | Mathews et al. ........... 711/108 |
| 6,236,658 B1 | | 5/2001 | Essbaum et al. |
| 6,237,061 B1 | * | 5/2001 | Srinivasan et al. ......... 711/108 |
| 6,240,003 B1 | | 5/2001 | McElroy |
| 6,243,667 B1 | | 6/2001 | Kerr et al. |
| 6,246,601 B1 | | 6/2001 | Pereira |
| 6,295,576 B1 | | 9/2001 | Ogura et al. |
| 6,307,855 B1 | | 10/2001 | Hariguchi |
| 6,493,812 B1 | * | 12/2002 | Lyon .......................... 711/207 |

OTHER PUBLICATIONS

"Advantages of CAM in ASIC–Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LAN-CAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

* cited by examiner

METHOD AND APPARATUS FOR POSSIBLY DECREASING THE NUMBER OF ASSOCIATIVE MEMORY ENTRIES BY SUPPLEMENTING AN ASSOCIATIVE MEMORY RESULT WITH DISCRIMINATOR BITS FROM AN ORIGINAL SET OF INFORMATION

FIELD OF THE INVENTION

This invention especially relates to computer and communications systems, including programming and using an associative memory such as, but not limited to a content-addressable memory; and more particularly, the invention relates to possibly decreasing the number of associative memory entries by supplementing an associative memory result with discriminator bits from an original set of information.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match. Various applications that use packet classification, such as Security Access Control, Quality of Service etc., typically need to perform many matches on source and destination port numbers, protocol and other header fields, etc. Additionally, supporting IPv6 and various tunneling techniques has increased the complexity of packet forwarding. For example, an IPv6 requires 128 bit forwarding and tunneling requires additional bits.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches etc.) to support these new protocols and services. However, known software and firmware implementations are relatively slow, and typically place a performance bound which may be incompatible with new requirements.

CAMs are increasingly being used in packet classification especially because of their performance. A typical implementation performs a lookup operation on a CAM with the CAM result being used as input to a memory, which produces the actual result used in processing a packet. However, these content-addressable memories are typically expensive in terms of power consumption and space, and are limited in the size of an input word (e.g., 72, 144, etc.) on which a lookup operation is performed. Desired are new methods and apparatus for providing needed matching capabilities, while possibly decreasing the size of an associative memory required or increasing the packet processing capabilities supported by an associative memory.

SUMMARY OF THE INVENTION

Systems and methods are disclosed for possibly decreasing the number of associative memory entries by supplementing an associative memory result with discriminator bits from an original set of information. One embodiment operates on a set of information, the set of information including a lookup word portion and a discriminator portion. A lookup word is derived based on the lookup word portion. A lookup operation is performed on an associative memory, such as, but not limited to a binary or ternary content-addressable memory, using the lookup word to generate an associative memory result. A memory lookup operation is performed on a memory based on the associative memory result and the discriminator portion.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Systems and methods are disclosed for possibly decreasing the number of associative memory entries by supplementing an associative memory result with discriminator bits from an original set of information. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to include a packet or any other information or data. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for possibly decreasing the number of associative memory entries by supplementing an associative memory result with discriminator bits from an original set of information. One embodiment operates on a set of information, the set of information including a lookup word portion and a discriminator portion. A lookup word is derived based on the lookup word portion. A lookup operation is performed on an associative memory, such as, but not limited to a binary or ternary content-addressable memory, using the lookup word to generate an associative memory result. A memory lookup operation is performed on a memory based on the associative memory result and the discriminator portion.

Figure 1:
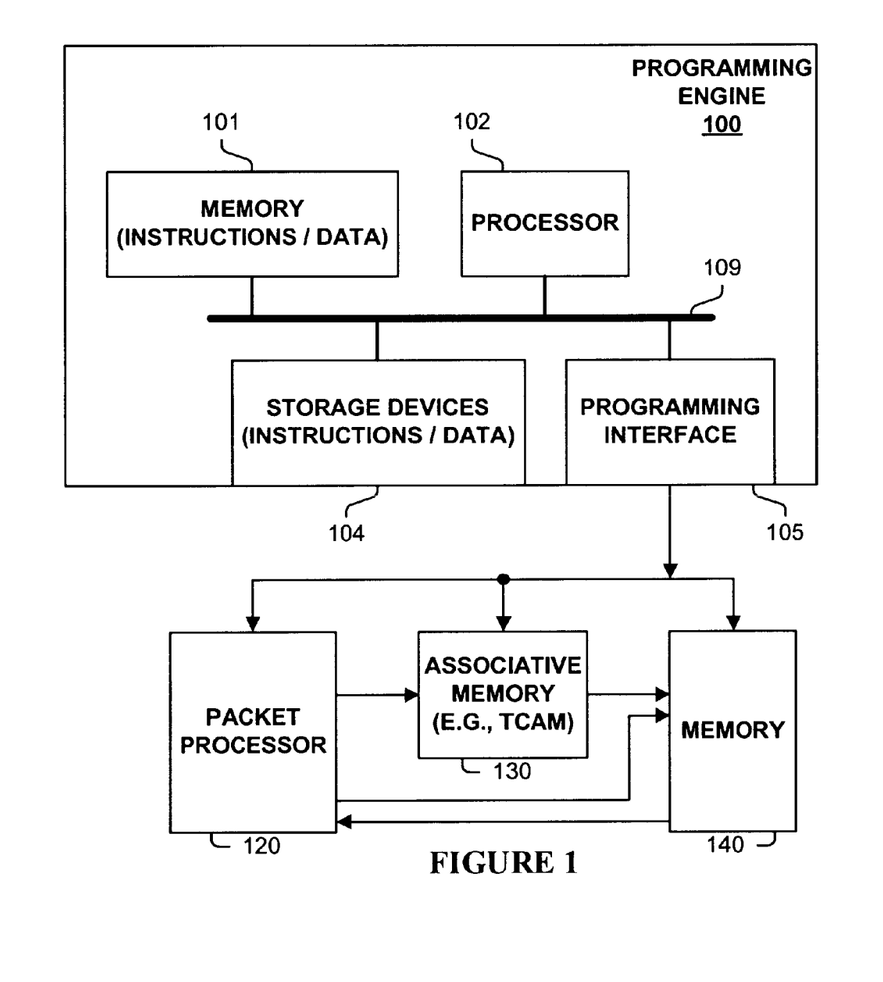
FIG. 1 is a block diagram of an embodiment for programming an associative memory and packet processor.

FIG. 1 illustrates one embodiment of a system, which may be part of a router or other communications or computer system, for programming and using a packet processor and an associative memory, such as, but not limited to a binary or ternary content-addressable memory. In one embodiment, programming engine 100 receives or determines a list of entries, an identification of lookup word and discriminator portions of data items, possibly a mask to program associative memory 130, and corresponding values to program memory 140. Programming engine 100 typically also configures packet processor to extract appropriate lookup word and discriminator portions of a set of information.

In one embodiment, programming engine 100 includes a processor 102, memory 101, storage devices 104, and programming interface 105, which are coupled via one or more communications mechanisms 109 (shown as a bus for illustrative purposes). Various embodiments of programming engine 100 may include more or less elements. The operation of programming engine 100 is typically controlled by processor 102 using memory 101 and storage devices 104 to perform one or more tasks or processes. Memory 101 is one type of computer-readable medium, and typically comprises random access memory (RAM), read only memory (ROM), flash memory, integrated circuits, and/or other memory components. Memory 101 typically stores computer-executable instructions to be executed by processor 102 and/or data which is manipulated by processor 102 for implementing functionality in accordance with the invention. Storage devices 104 are another type of computer-readable medium, and typically comprise solid state storage media, disk drives, diskettes, networked services, tape drives, and other storage devices. Storage devices 104 typically store computer-executable instructions to be executed by processor 102 and/or data which is manipulated by processor 102 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 2A:
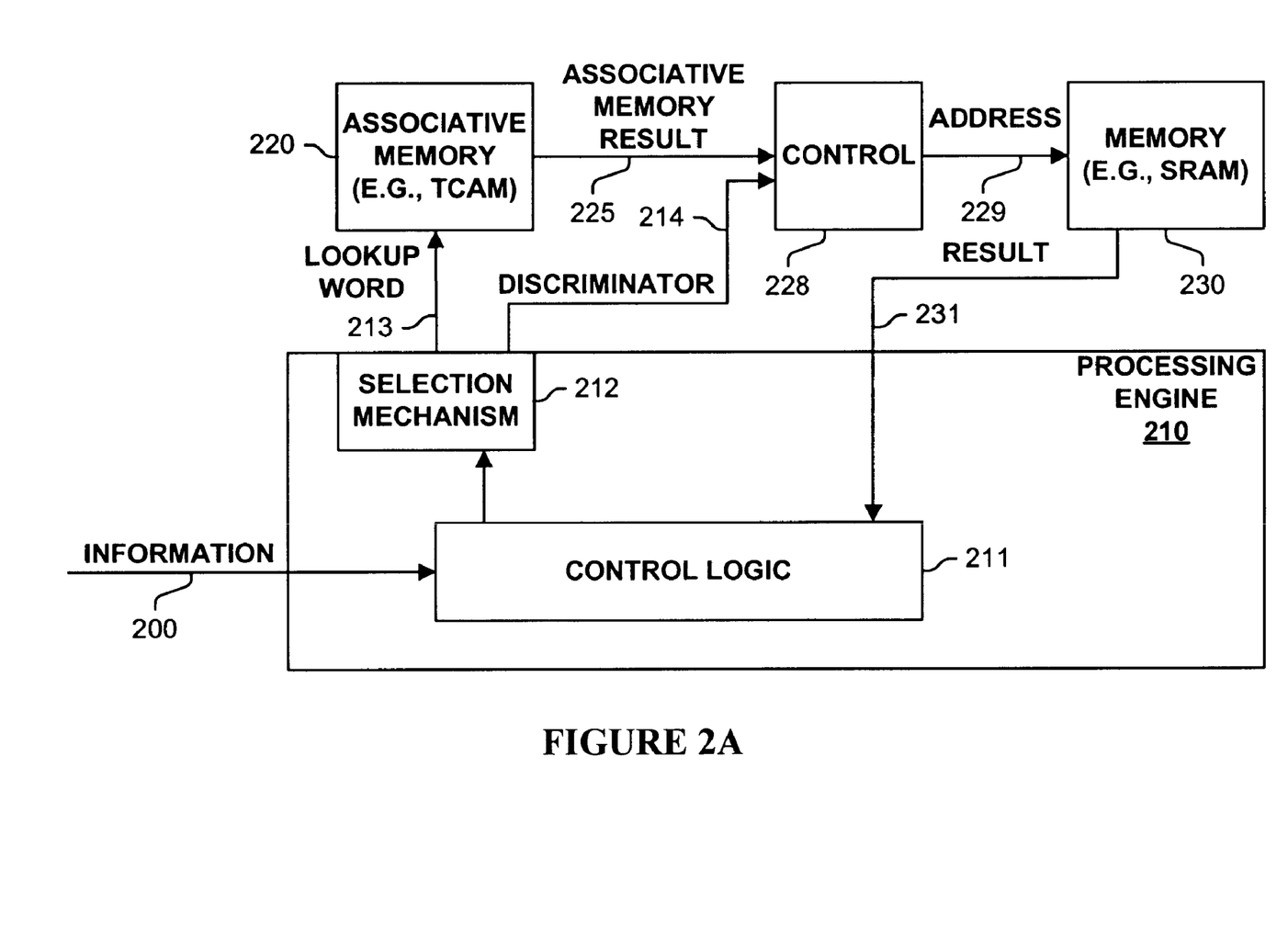
FIGS. 2A–B are block diagrams of exemplary embodiments performing packet processing.

FIG. 2A illustrates one embodiment of a system, which may be part of a router or other communications or computer system, for programming and using a packet processor and an associative memory, such as, but not limited to a binary or ternary content-addressable memory. Information 200, such as packets or portions thereof, is received by processing engine 210. Control logic 211 typically controls the operation of processing engine 210 and forwards a set of received information to a selection mechanism 212, which selectively provides a lookup word 213 to associative memory 220 and a discriminator 214 to memory 230. In one embodiment, selection mechanism 212 is simply hardwired circuitry. In one embodiment, selection mechanism 212 comprises a dynamic, static, and/or programmable mechanism, including such devices as a matrix, shift register, and other selection devices to selectively extract lookup word 213 and discriminator 214. In one embodiment, discriminator 214 includes a small number (e.g., between one and sixteen) of bits of information 200.

Associative memory 220 typically performs a lookup operation based on lookup word 213, which may optionally include information from another source or other statically or dynamically programmed information. The produced associative memory result 225 and discriminator 214 are used by control 228 to produce address 229, which is provided to memory 230 to produce result 231. Control 228 can manipulate associative memory result 225 and discriminator 214 in any conceivable manner to produce address 229. In one embodiment, memory result 225 and discriminator 214 are concatenated together to produce memory address 229. In one embodiment, control 228 manipulates and possibly performs a hashing operation to generate address 229. In one embodiment, memory result 225 and discriminator 214 are provided directly to memory 230. Based on associative memory result 225 and discriminator 214, memory 230 produces result 231, which is typically used by processing engine 210 to process information 200 (e.g., a received packet.)

Figure 2B:
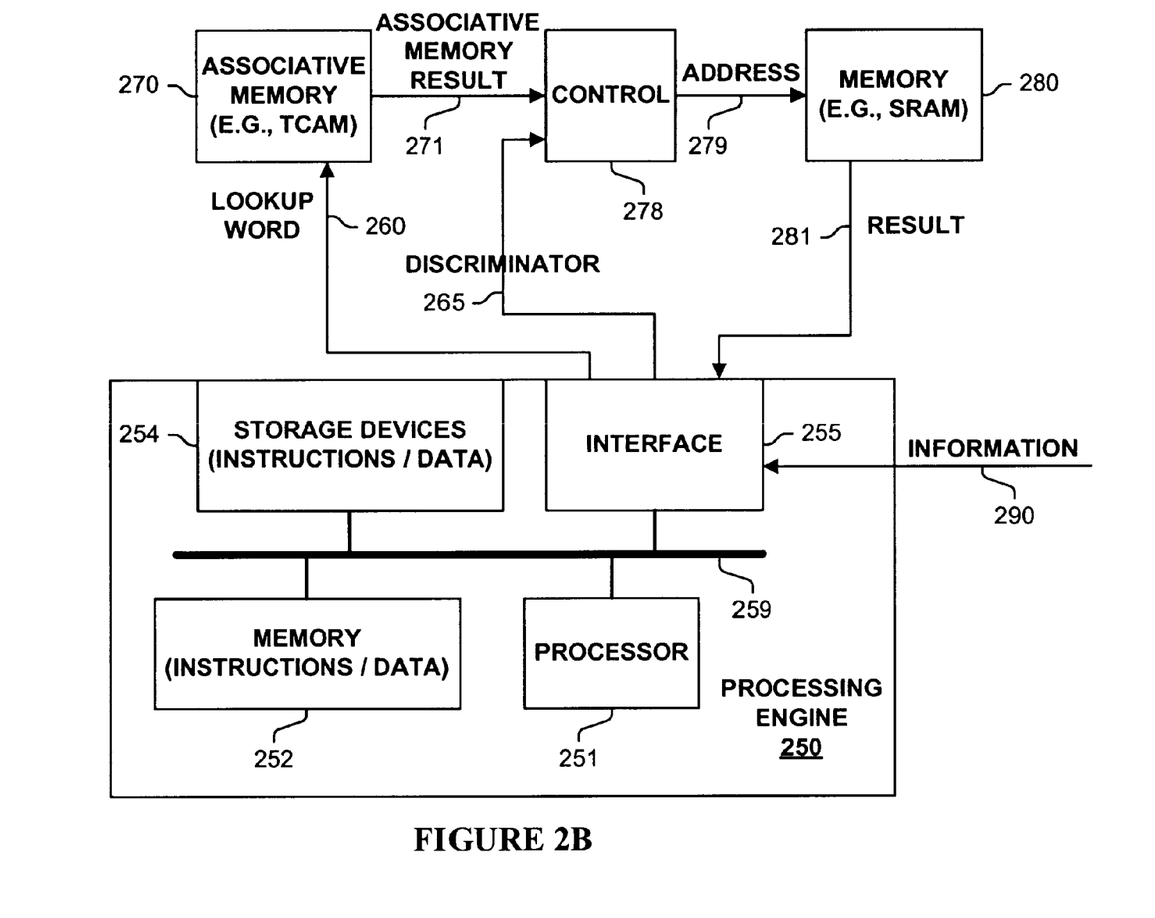

FIG. 2B illustrates one embodiment of a system, which may be part of a router or other communications or computer system, for programming and using multiple virtual portions of a single associative memory, such as, but not limited to a binary or ternary content-addressable memory. In one embodiment, processing engine 250 includes a processor 251, memory 252, storage devices 254, and interface 255, which are coupled via one or more communications mechanisms 259 (shown as a bus for illustrative purposes). Various embodiments of processing engine 250 may include more or less elements. The operation of processing engine 250 is typically controlled by processor 251 using memory 252 and storage devices 254 to perform one or more tasks or processes.

Information 290, such as packets or portions thereof, is received by processing engine 250, which extracts a lookup word 260 and discriminator 265, which are provided to associative memory 270 and memory 280 respectively via interface 255. A lookup operation is performed on lookup word 260 by associative memory 270 to produce associative memory result 271, which is used, along with discriminator 265, as input to control 278 to produce address 279 used by memory 280 to produce one or more results 281. In one embodiment, associative memory result 271 and discriminator 265 are provided directly to control memory 280.

Figure 3A:
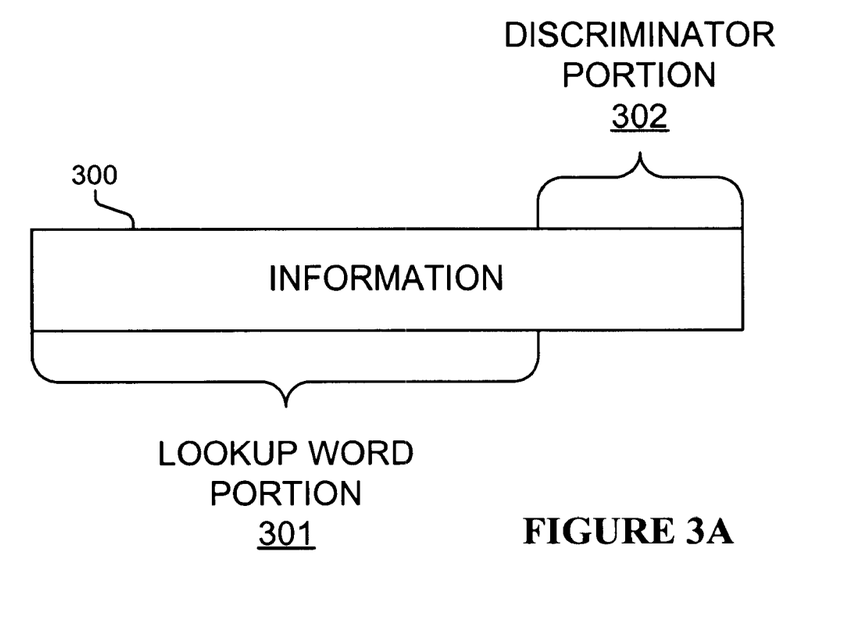
FIGS. 3A–C are exemplary sets of information having lookup word and discriminator portions.
Figure 3B:
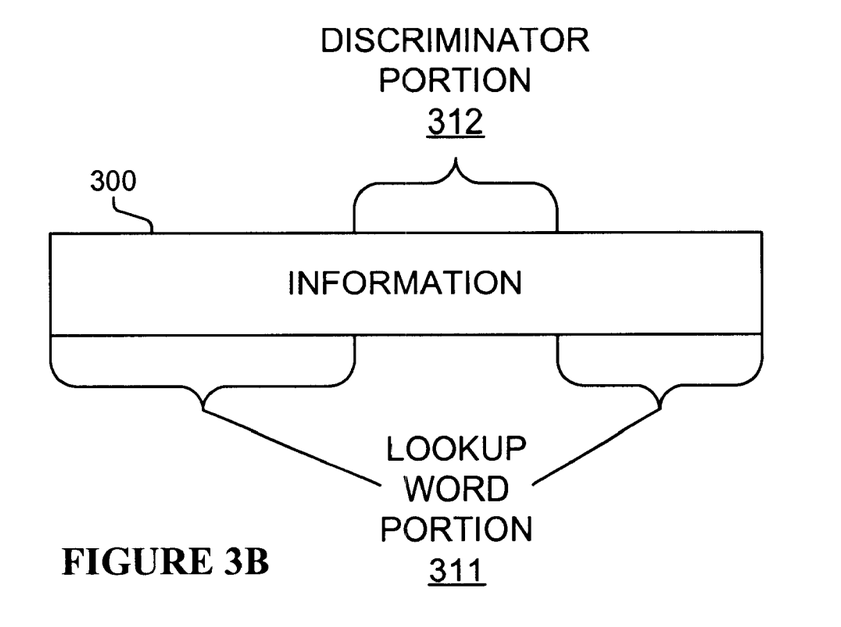
Figure 3C:
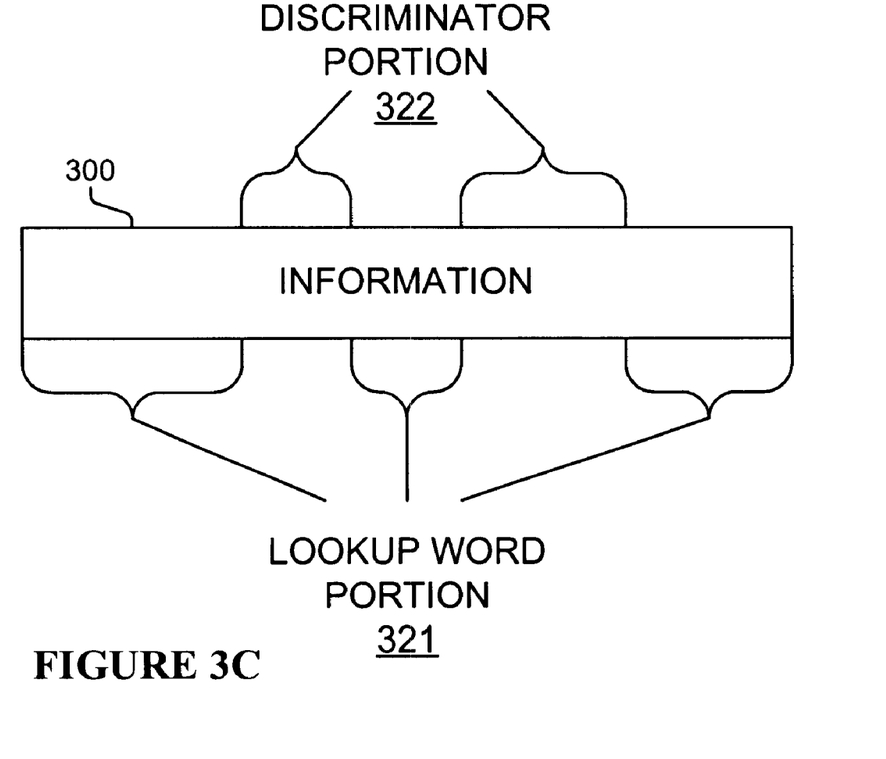

FIGS. 3A–C illustrate an exemplary extraction locations for the lookup word and discriminator portions of information 300. As shown in FIG. 3A, lookup word portion 301 and discriminator portion 302 are both contiguous blocks of bits within information 300. As shown in FIG. 3B discriminator portion 312 is contiguous within a distributed lookup word portion 311 within information 300. As shown in FIG. 3C, lookup word portion 321 and discriminator portion 322 are extracted from distributed locations within information 300. Selection mechanism 212 (FIG. 2A), processing engine 250 (FIG. 2B), or another selection mechanism used in one embodiment selectively, whether statically or programmatically, extracts the appropriate lookup word and discriminator portions.

Figure 4:
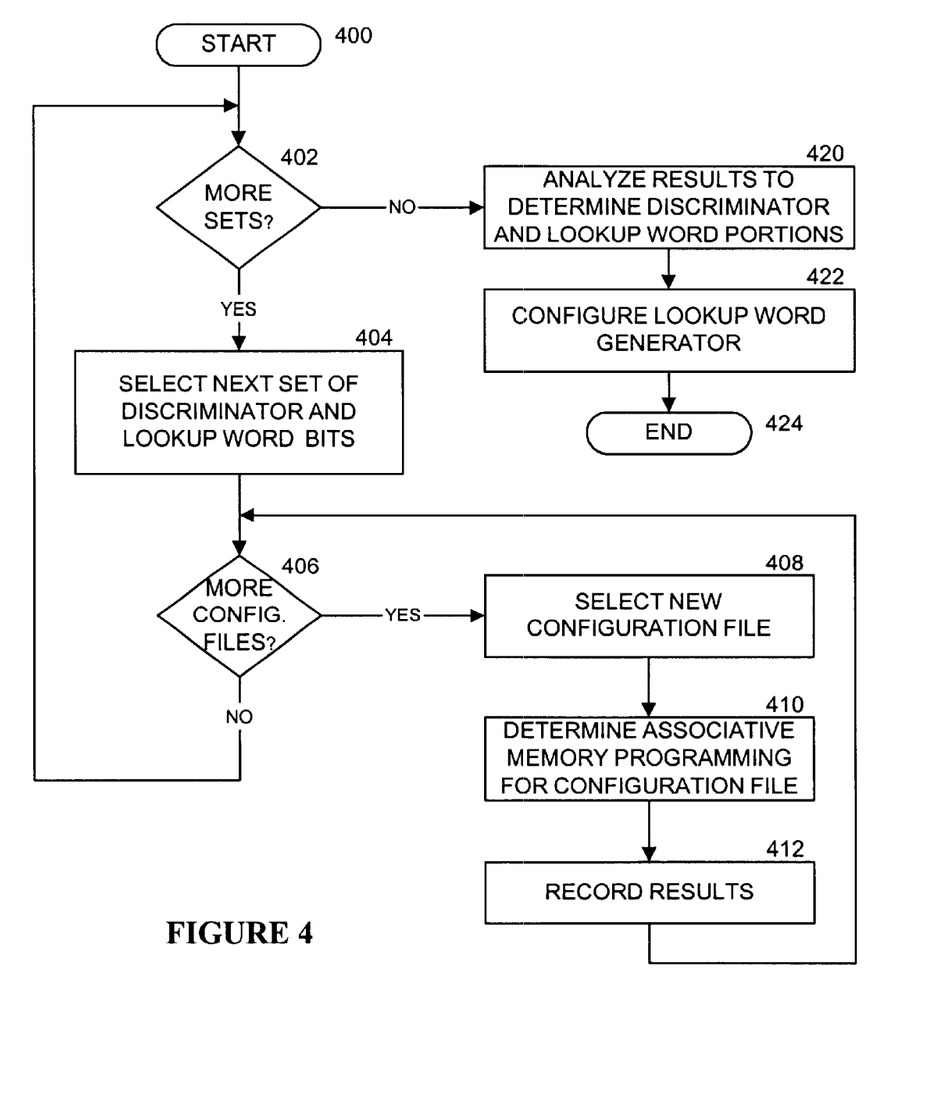
FIG. 4 is a block diagram of a process for determining a partitioning of a set of information into lookup word and discriminator portions.

FIG. 4 illustrates a flow diagram of one process used in one embodiment for determining a partitioning of a set of information into lookup word and discriminator portions, and for optionally configuring or programming a lookup word generator (e.g., a selection mechanism) to extracting the appropriate portions of a received set of information. Processing begins with process block 400. If, as determined in process block 402, while there are more sets of discriminator bits, process blocks 404–412 are repeatedly performed. Each possible set of discriminator bits may include a single bit or multiple bits, which each bit located in any position within a set of information. In process block 404, a next set of discriminator and lookup word bits are selected. Then, as determined in process block 406, while there are more exemplary configuration files to test, a new configuration file is selected in process block 408, an associative memory programming is determined for the current configuration file, and the results are recorded in process block 412. In one embodiment, the results include the number of resultant associative memory entries.

When all sets of discriminator bits have been tested as determined in process block 402, the results are analyzed in process block 420 to determine and select the appropriate discriminator and lookup word portions. For example, a selection of the discriminator and lookup word portions may be selected based on a minimum number of associative memory entries, and possibly a number of memory locations required. Next, in process block 422, the lookup word generator is configured to produce the required lookup word and discriminator portions of a received set of information. In one embodiment, the configuration is either manually or automatically configured, such as by physically routing connections or programming a lookup word generator. Processing is complete as indicated in process block 424.

Figure 5:
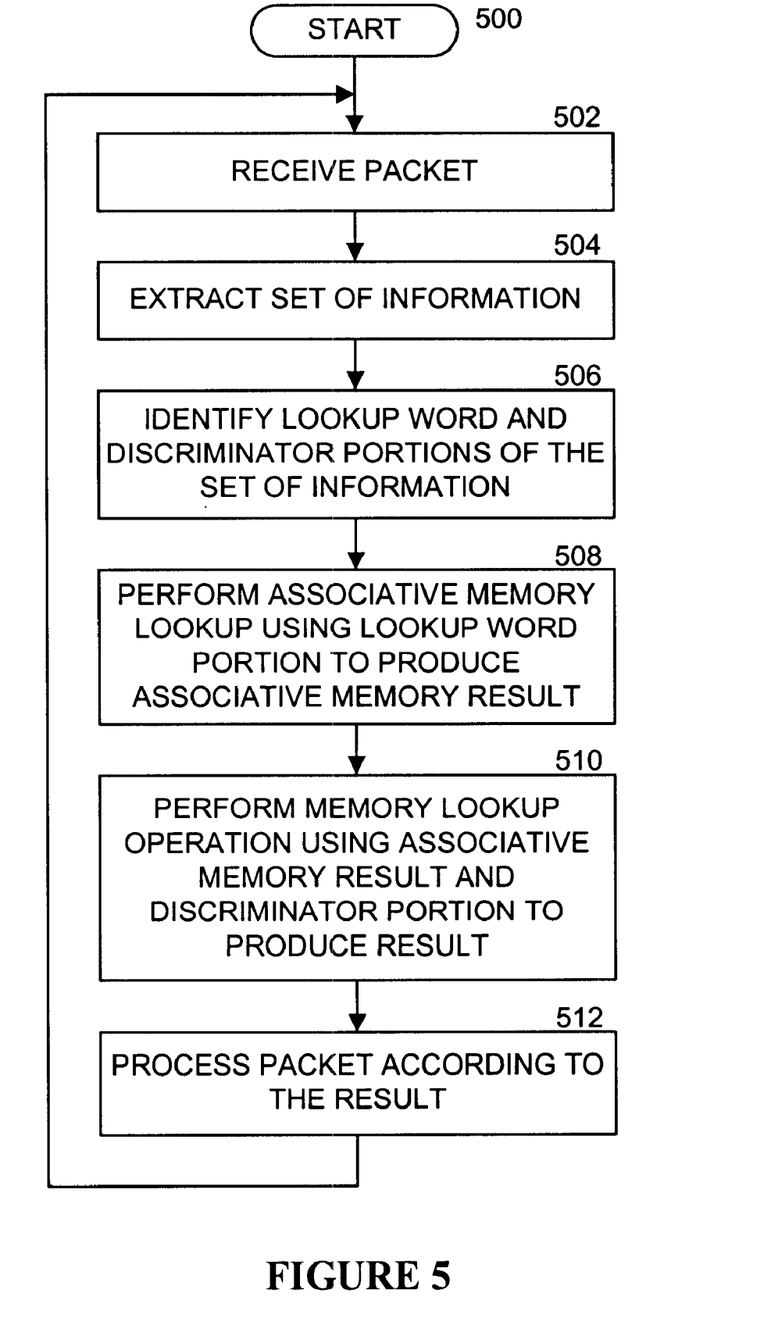
FIG. 5 is a flow diagram of a process for used in one embodiment for producing a result based on lookup word and discriminator portions of a set of information.

FIG. 5 illustrates a process used in one embodiment to receive and process packets (or other types of sets of information.) Processing begins with process block 500, and proceeds to process block 502, wherein a packet is received. Next, a set of information is extracted from the received packet. In process block 506, the lookup word and discriminator portions are extracted, and in process block 508, an associative memory lookup is performed based on the lookup word portion to produce an associative memory result. Next, in process block 510, a memory lookup operation is performed based on the associative memory result and the discriminator portion to produce a result, which is used in process block 512 to process the packet. Processing returns to process block 502 to receive and process more packets.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed using a set of information, the set of information including a lookup word portion and a discriminator portion and the lookup word portion includes a plurality of non-contiguous data from the set of information, the method comprising:
    performing a lookup operation on an associative memory using a lookup word including the lookup word portion to generate an associative memory result; and
    performing a memory lookup operation on a memory based on the associative memory result and the discriminator portion.

2. The method of claim 1, wherein said performing the memory lookup operation based on the associative memory result and the discriminator portion includes deriving a memory address including the associative memory result and the discriminator portion.

3. The method of claim 2, wherein the memory address includes the associative memory result concatenated with the discriminator portion.

4. The method of claim 1, wherein the associative memory includes a ternary content-addressable memory.

5. The method of claim 1, wherein the discriminator portion includes a small number of bits.

6. The method of claim 5, wherein the small number of bits equals two.

7. The method of claim 1, wherein the set of information includes a network address.

8. The method of claim 7, wherein the discriminator portion includes a part of the network address.

9. The method of claim 1, further comprising receiving the set of information.

10. A method comprising:

identifying a plurality of sets of potential discriminator bits;

determining an associative memory programming for each of the plurality of sets of potential discriminator bits for each one of one or more configuration files to produce a set of results;

analyzing the set of results to identify a discriminator portion and a lookup word portion of an input word;

wherein the set of results includes a number of associative memory entries generated by said determining the associative memory programing; and wherein said analyzing the set of results includes determining which of the plurality of sets of potential discriminator bits produces a minimal number of associative memory entries.

11. An apparatus configured to operate on a set of information, the set of information including a lookup word portion and a discriminator portion and the lookup word portion includes a plurality of non-contiguous data from the set of information, the apparatus comprising:

means for deriving a lookup word based on the lookup word portion;

means for performing a lookup operation on an associative memory using the lookup word to generate an associative memory result; and means for performing a memory lookup operation on a memory based on the associative memory result and the discriminator portion.

12. The apparatus of claim 11, wherein said means for performing the memory lookup operation based on the associative memory result and the discriminator portion includes means for deriving a memory address including the associative memory result and the discriminator portion.

13. The apparatus of claim 11, wherein the memory address includes the associative memory result concatenated with the discriminator portion.

14. The apparatus of claim 11, wherein the associative memory includes a ternary content-addressable memory.

15. The apparatus of claim 11, wherein the set of information includes a network address.

16. The apparatus of claim 15, wherein the discriminator portion includes a part of the network address.

17. The method of claim 10, comprising:

programming an associative memory with the associative memory programming corresponding to a particular set of the plurality of sets of potential discriminator bits that produces the minimal number of associative memory entries;

receiving a particular input word comprising a particular discriminator portion and a particular lookup word portion;

performing a lookup operation on an associative memory using a lookup word including the particular discriminator portion to generate an associative memory result; and performing a memory lookup operation on a memory based on the associative memory result and the particular discriminator portion.

18. The method of claim 17, wherein the associative memory includes a ternary content-addressable memory.

19. The method of claim 17, wherein the set of information includes a network address.

20. The method of claim 19, wherein the discriminator portion includes a part of the network address.

21. A computer-readable medium containing computer-executable instructions for performing steps, said steps comprising:

identifying a plurality of sets of potential discriminator bits;

determining an associative memory programming for each of the plurality of sets of potential discriminator bits for each one of one or more configuration files to produce a set of results;

analyzing the set of results to identify a discriminator portion and a lookup word portion of an input word;

wherein the set of results includes a number of associative memory entries generated by said determining the associative memory programing; and wherein said analyzing the set of results includes determining which of the plurality of sets of potential discriminator bits produces a minimal number of associative memory entries.

22. A method performed using a set of information, the set of information including a lookup word portion and a discriminator portion, the method comprising:

performing a lookup operation on a ternary content-addressable memory (TCAM) using a lookup word including the lookup word portion to generate a TCAM result; and performing a memory lookup operation on a memory based on the TCAM result and the discriminator portion.

23. The method of claim 22, wherein said performing the memory lookup operation based on the associative memory result and the discriminator portion includes deriving a memory address including the associative memory result and the discriminator portion.

24. The method of claim 23, wherein the memory address includes the associative memory result concatenated with the discriminator portion.

* * * * *

UNITED STATES PATENT AND TRADEMARK OFFICE
CERTIFICATE OF CORRECTION

PATENT NO. : 6,715,029 B1
DATED : March 30, 2004
INVENTOR(S) : Trainin et al.

It is certified that error appears in the above-identified patent and that said Letters Patent is hereby corrected as shown below:

Column 7,
Line 22, replace "programing" with -- programming --

Column 8,
Line 33, replace "programing" with -- programming --

Signed and Sealed this

Twenty-sixth Day of July, 2005

JON W. DUDAS
*Director of the United States Patent and Trademark Office*